(12) United States Patent
Van Der Velde et al.

(10) Patent No.: US 12,368,546 B2
(45) Date of Patent: Jul. 22, 2025

(54) METHOD AND APPARATUS FOR IMPROVEMENTS OF AUTONOMOUS GAPS

(71) Applicant: Samsung Electronics Co., Ltd., Suwon-si (KR)

(72) Inventors: Himke Van Der Velde, Staines (GB); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/786,319

(22) PCT Filed: Dec. 17, 2020

(86) PCT No.: PCT/KR2020/018586
§ 371 (c)(1),
(2) Date: Jun. 16, 2022

(87) PCT Pub. No.: WO2021/125850
PCT Pub. Date: Jun. 24, 2021

(65) Prior Publication Data
US 2023/0361945 A1 Nov. 9, 2023

(30) Foreign Application Priority Data

Dec. 17, 2019 (GB) .................................. 1918653
Dec. 18, 2019 (GB) .................................. 1918710
Dec. 16, 2020 (GB) .................................. 2019923

(51) Int. Cl.
*H04L 5/00* (2006.01)
*H04W 8/18* (2009.01)
*H04W 36/00* (2009.01)

(52) U.S. Cl.
CPC ............. *H04L 5/0033* (2013.01); *H04W 8/18* (2013.01); *H04W 36/00835* (2018.08)

(58) Field of Classification Search
CPC .. H04L 5/0033; H04W 8/18; H04W 36/00835
See application file for complete search history.

(56) References Cited

U.S. PATENT DOCUMENTS

| | | | |
|---|---|---|---|
| 9,750,042 | B2 | 8/2017 | Kazmi |
| 2013/0039342 | A1 | 2/2013 | Kazmi |

(Continued)

FOREIGN PATENT DOCUMENTS

| | | | | |
|---|---|---|---|---|
| WO | 2019/032658 A1 | | 2/2019 | |
| WO | WO-2020032845 A1 | * | 2/2020 | ............ H04W 24/02 |
| WO | 2020/076229 A1 | | 4/2020 | |

OTHER PUBLICATIONS

Ericsson, Support for autonomous gap ANR (towards 2G/3G/4G neighbour cells) configured by LTE / MN in EN-DC, R4-1906427, 3GPP TSG-RAN WG4 Meeting #91, May 3, 2019, Reno, United States of America.

(Continued)

*Primary Examiner* — Duc C Ho
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Disclosed is a method of a telecommunication network configuring a User Equipment, UE, to report information measured or obtained from a neighbouring cell, whereby the network indicates to the UE whether the UE is allowed to utilise an Autonomous Gap, AG, for its communication with one or more serving cells, while obtaining the information from the neighbouring cell.

20 Claims, 8 Drawing Sheets

(56) References Cited

U.S. PATENT DOCUMENTS

| | | | |
|---|---|---|---|
| 2014/0206341 A1* | 7/2014 | Siomina | H04W 36/0085 455/422.1 |
| 2016/0081021 A1* | 3/2016 | Abdel-Samad | H04W 76/50 370/311 |
| 2016/0088534 A1* | 3/2016 | Axmon | H04L 5/0055 370/252 |

OTHER PUBLICATIONS

Vivo et al., Autonomous Gap capability for CGI reporting, R2-1914949, 3GPP TSG-RAN WG2 Meeting #108, Nov. 8, 2019, Reno, USA.
Ericsson, ANR leftovers from release 15, R2-1910869, 3GPP TSG-RAN WG2 #107, Aug. 15, 2019, Prague, CZ.
Ericsson, Discussion on ANR Measurement using single set of measurements, R2-1907467, 3GPP TSG-RAN WG2 #105bis, May 3, 2019, Reno, USA.
GB Office Action dated May 7, 2021, issued in GB Application No. GB2019923.8.
International Search Report dated Mar. 25, 2021, issued in International Application No. PCT/KR2020/018586.

* cited by examiner

[Fig. 1]
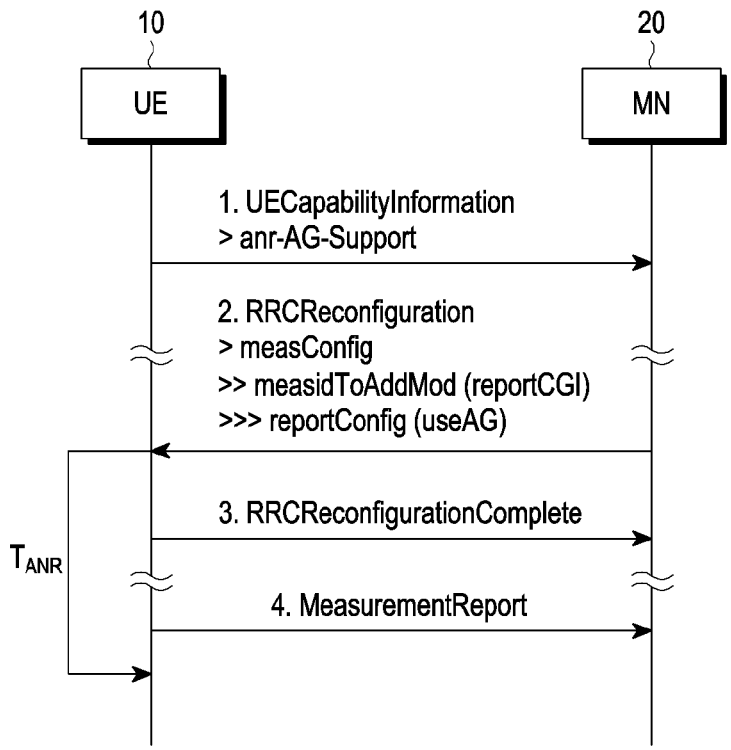
[Fig. 2a]
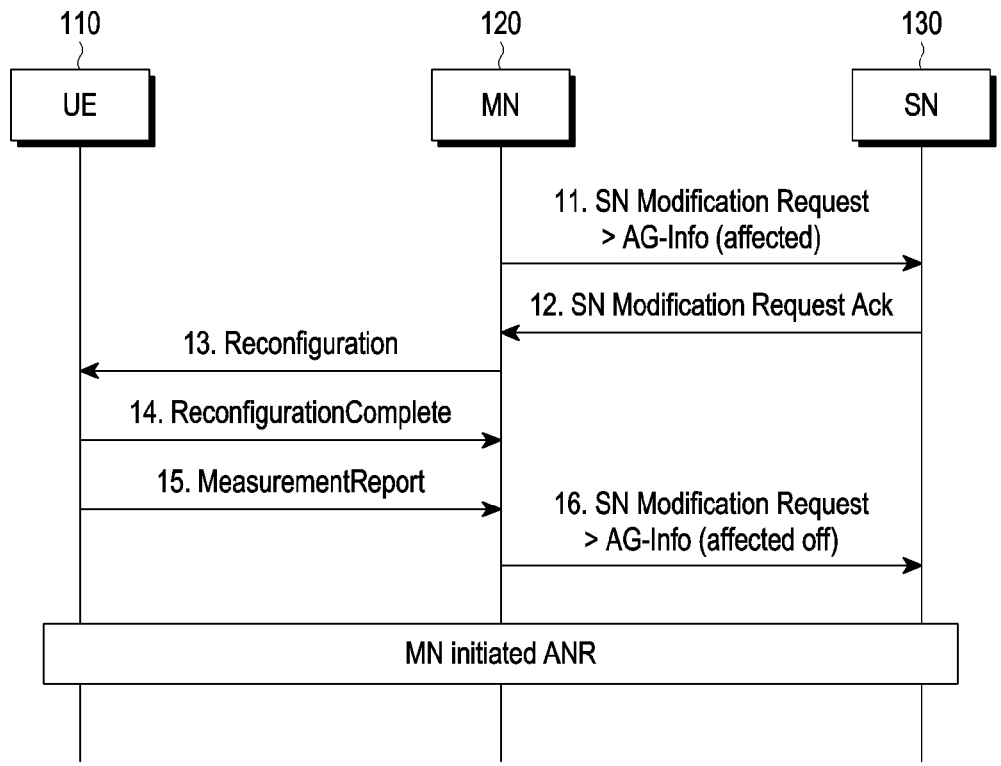

[Fig. 2b]
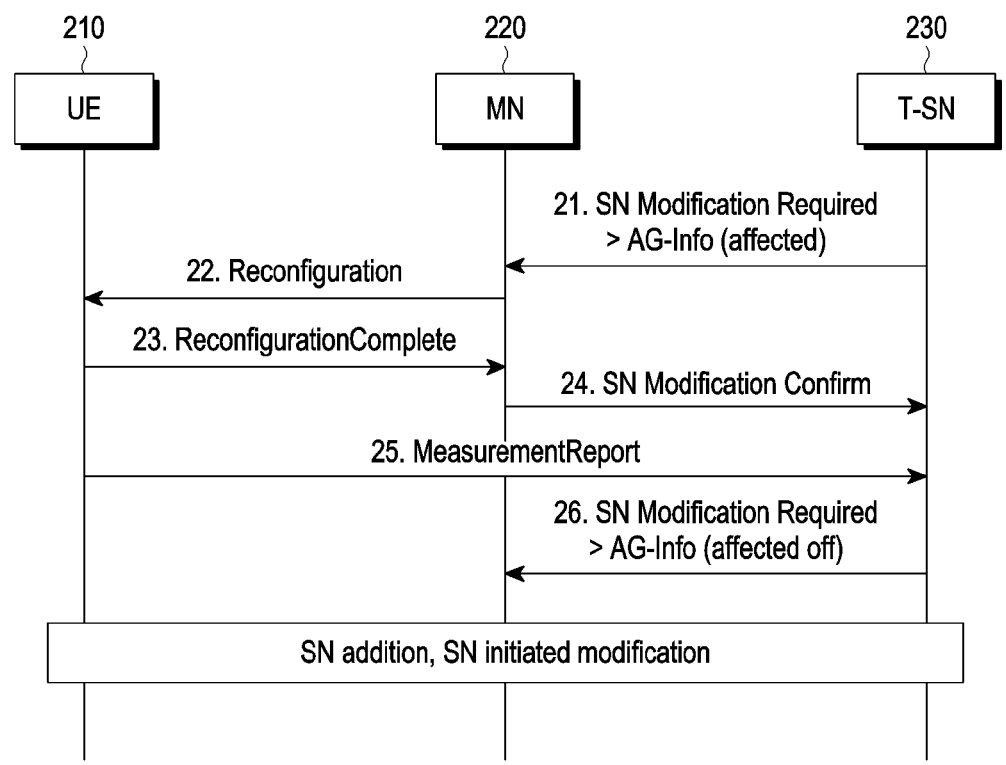

[Fig. 3]
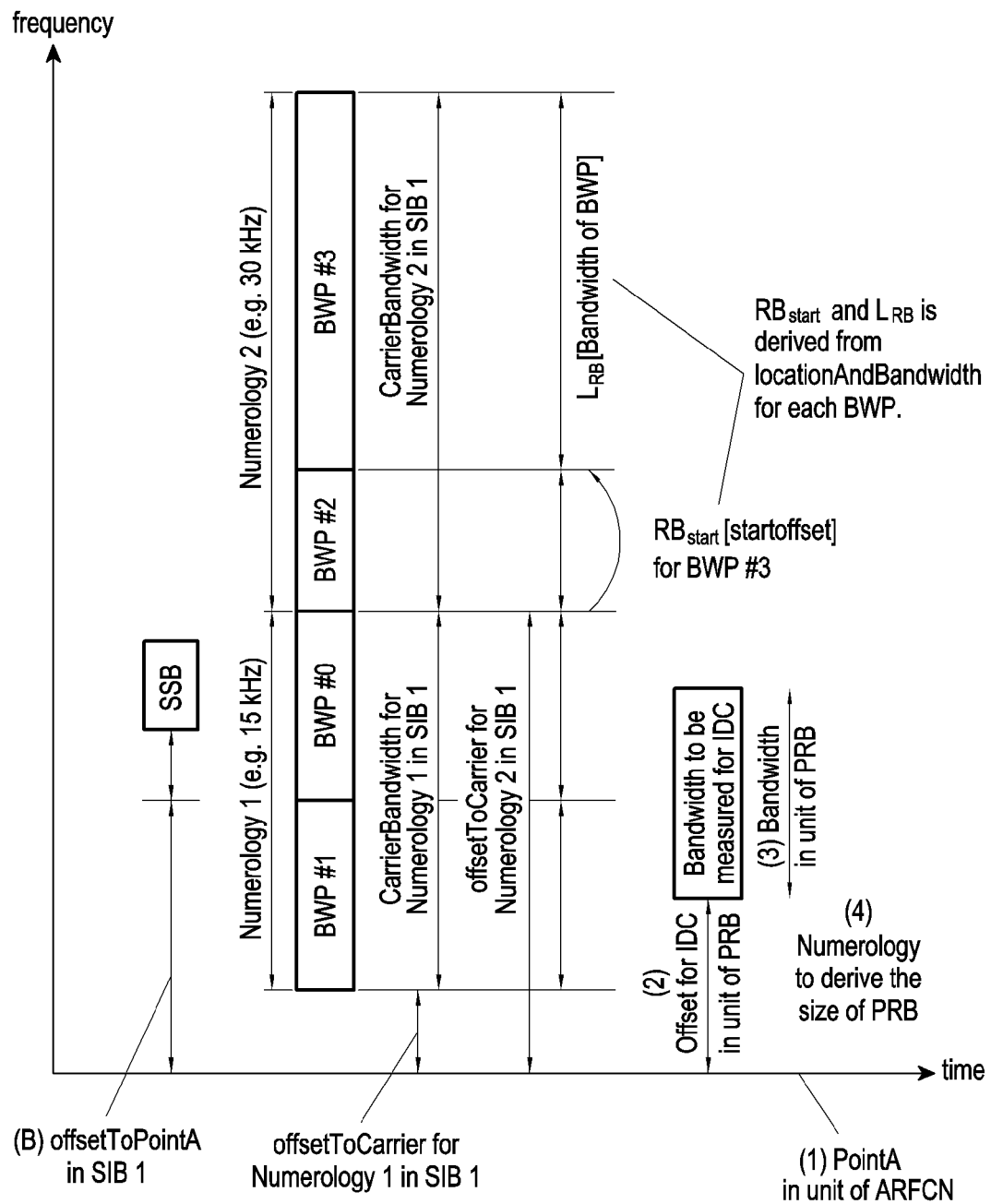

[Fig. 4]
```
IDC-Config-r11 ::=              SEQUENCE {
    idc-Indication-r11              ENUMERATED {setup}        OPTIONAL,  -- Need OR
    autonomousDenialParameters-r11      SEQUENCE {
        autonomousDenialSubframes-r11       ENUMERATED {n2, n5, n10, n15,
                                                n20, n30, spare2, spare1},
        autonomousDenialValidity-r11        ENUMERATED {
                                                sf200, sf500, sf1000, sf2000,
                                                spare4, spare3, spare2, spare1}
    }       OPTIONAL,    -- Need OR
    ...,
    [[ idc-Indication-UL-CA-r11         ENUMERATED {setup}    OPTIONAL    -- Cond idc-Ind
    ]],
    [[ idc-HardwareSharingIndication-r13    ENUMERATED {setup}    OPTIONAL    -- Need OR
    ]],
    [[ idc-Indication-MRDC-r15          CHOICE{
            release                 NULL,
            setup                   CandidateServingFreqListNR-r15
        }       OPTIONAL    -- Cond idc-Ind
    ]],
    [[ idc-Indication-MRDC-v16xy    CHOICE{
            release                 NULL,
            setup                   CandidateServingFreqListNR-v16xy
        }       OPTIONAL    -- Cond idc-Ind
    ]]
}

CandidateServingFreqListNR-v16xy ::= SEQUENCE (SIZE (1..maxFreqIDC-r11)) OF BW-PortionListNR-r16

BW-PortionListNR-r16 ::= SEQUENCE (SIZE (0..maxBW-Portions-r16)) OF BW-PortionNR-r16

BW-PortionNR-r16 ::=        SEQUENCE {
    locationAndBandwidth            INTEGER (0..37949),
    subcarrierSpacing               ENUMERATED {kHz15, kHz30, kHz60, kHz120, kHz240,
                                        spare3, spare2, spare1},
    cyclicPrefix                    ENUMERATED { extended }     OPTIONAL    -- Need R
}
```

[Fig. 5]

```
IDC-Config-r11 ::=            SEQUENCE {
    idc-Indication-r11              ENUMERATED {setup}        OPTIONAL,   -- Need OR
    autonomousDenialParameters-r11      SEQUENCE {
        autonomousDenialSubframes-r11       ENUMERATED {n2, n5, n10, n15,
                                                n20, n30, spare2, spare1},
        autonomousDenialValidity-r11        ENUMERATED {
                                                sf200, sf500, sf1000, sf2000,
                                                spare4, spare3, spare2, spare1}
    }       OPTIONAL,    -- Need OR
    ...,
    [[ idc-Indication-UL-CA-r11         ENUMERATED {setup}    OPTIONAL    -- Cond idc-Ind
    ]],
    [[ idc-HardwareSharingIndication-r13   ENUMERATED {setup}    OPTIONAL    -- Need OR
    ]],
    [[ idc-Indication-MRDC-r15      CHOICE{
        release             NULL,
        setup               CandidateServingFreqListNR-r15
    }           OPTIONAL    -- Cond idc-Ind
    ]],
    [[ idc-Indication-MRDC-v16xy    CHOICE{
        release             NULL,
        setup               CandidateServingFreqListExtNR-r16
    }           OPTIONAL    -- Cond idc-Ind
    ]]
}
```

```
IDC-Config-r11 ::=            SEQUENCE {
    idc-Indication-r11              ENUMERATED {setup}        OPTIONAL,   -- Need OR
    autonomousDenialParameters-r11      SEQUENCE {
        autonomousDenialSubframes-r11       ENUMERATED {n2, n5, n10, n15,
                                                n20, n30, spare2, spare1},
        autonomousDenialValidity-r11        ENUMERATED {
                                                sf200, sf500, sf1000, sf2000,
                                                spare4, spare3, spare2, spare1}
    }       OPTIONAL,    -- Need OR
    ...,
    [[ idc-Indication-UL-CA-r11         ENUMERATED {setup}    OPTIONAL    -- Cond idc-Ind
    ]],
    [[ idc-HardwareSharingIndication-r13   ENUMERATED {setup}    OPTIONAL    -- Need OR
    ]],
    [[ idc-Indication-MRDC-r15      CHOICE{
        release             NULL,
        setup               CandidateServingFreqListNR-r15
    }           OPTIONAL    -- Cond idc-Ind
    ]],
    [[ idc-Indication-MRDC-v16xy    CHOICE{
        release             NULL,
        setup               CandidateServingFreqListExtNR-r16
    }           OPTIONAL    -- Cond idc-Ind
    ]]
}
```

[Fig. 6]

```
InDeviceCoexIndication-v1530-IEs ::= SEQUENCE {
    mrdc-AssistanceInfo-r15              MRDC-AssistanceInfo-r15           OPTIONAL,
    nonCriticalExtension                 InDeviceCoexIndication-v16x0-IEs OPTIONAL
}

InDeviceCoexIndication-v16x0-IEs ::= SEQUENCE {
    mrdc-AssistanceInfo-v16x0            MRDC-AssistanceInfo-r16x0         OPTIONAL,
    nonCriticalExtension                 SEQUENCE {}                       OPTIONAL
}
```

```
MRDC-AssistanceInfo-v16x0 ::= SEQUENCE {
    affectedCarrierFreqCombInfoListMRDC-v16x0    SEQUENCE (SIZE (1..maxCombIDC-r11)) OF
AffectedCarrierFreqCombInfoMRDC-r16x0,
    ...
}
```

```
AffectedCarrierFreqCombNR-v16x0 ::= SEQUENCE (SIZE (1..maxServCellNR-r15)) OF AffectedBW-
PortionInfoListNR-r16

AffectedBW-PortionInfoListNR-r16 ::= SEQUENCE (SIZE (1..maxBW-Portions-r16)) OF AffectedBW-
PortionInfoNR-r16

AffectedBW-PortionInfoNR-r16 ::= SEQUENCE {
    bw-PortionNR-r16              BW-PortionNR-r16,
    idc-Info-r16                  IDC-Information-r16          OPTIONAL
} maxBW-Portions-r16            INTEGER ::= 4      -- Max no of BW portions per band BW-PortionNR--r16 ::=         SEQUENCE {
    locationAndBandwidth          INTEGER (0..37949),
    subcarrierSpacing             ENUMERATED {kHz15, kHz30, kHz60, kHz120, kHz240,
                                  spare3, spare2, spare1},
    cyclicPrefix                  ENUMERATED { extended }       OPTIONAL   -- Need R
}

IDC-Information-r16 ::=       SEQUENCE {
    victimSystemType-r16          VictimSystemType-r11,
    interferenceDirectionMRDC-r16     ENUMERATED {eutra-nr, nr, other, eutra-nr-other,
                                  nr-other, spare3, spare2, spare1}
}
```

[Fig. 7]

```
InDeviceCoexIndication-v1530-IEs ::= SEQUENCE {
    mrdc-AssistanceInfo-r15              MRDC-AssistanceInfo-r15              OPTIONAL,
    nonCriticalExtension                 InDeviceCoexIndication-v16x0-IEs OPTIONAL
}

InDeviceCoexIndication-v16x0-IEs ::= SEQUENCE {
    mrdc-AssistanceInfo-v16x0            MRDC-AssistanceInfo-r16x0            OPTIONAL,
    nonCriticalExtension                 SEQUENCE {}                          OPTIONAL
}
```

```
MRDC-AssistanceInfo-v16x0 ::= SEQUENCE {
    affectedCarrierFreqCombInfoListExtMRDC-r16    SEQUENCE (SIZE (1..maxCombIDC-r16)) OF
AffectedCarrierFreqCombInfoExtMRDC-r16,
    ...
}

AffectedCarrierFreqCombInfoExtMRDC-r16 ::= SEQUENCE {
    victimSystemType-r16             VictimSystemType-r11,
    interferenceDirectionMRDC-r16    ENUMERATED {eutra-nr, nr, other, eutra-nr-other,
                                     nr-other, spare3, spare2, spare1},
    affectedCarrierFreqCombMRDC-r16  SEQUENCE {
        affectedCarrierFreqCombEUTRA-r16    AffectedCarrierFreqComb-r15    OPTIONAL,
        affectedCarrierFreqCombNR-r16       AffectedCarrierFreqCombNR-r16
    }                                 OPTIONAL
}

AffectedCarrierFreqCombNR-r16 ::= SEQUENCE (SIZE (1..maxServCellNR-r15)) OF AffectedCarrierFreqNR-r16

AffectedCarrierFreqNR-r16 ::=    SEQUENCE {
    carrierFreqNR-r16                ARFCN-ValueNR-r15,
    bw-PortionNR-r16                 BW-PortionNR-r16           OPTIONAL    -- Need
}

BW-PortionNR=-r16 ::=            SEQUENCE {
    locationAndBandwidth             INTEGER (0..37949),
    subcarrierSpacing                ENUMERATED {kHz15, kHz30, kHz60, kHz120, kHz240,
                                     spare3, spare2, spare1},
    cyclicPrefix                     ENUMERATED { extended }     OPTIONAL    -- Need R
}
```

[Fig. 8]
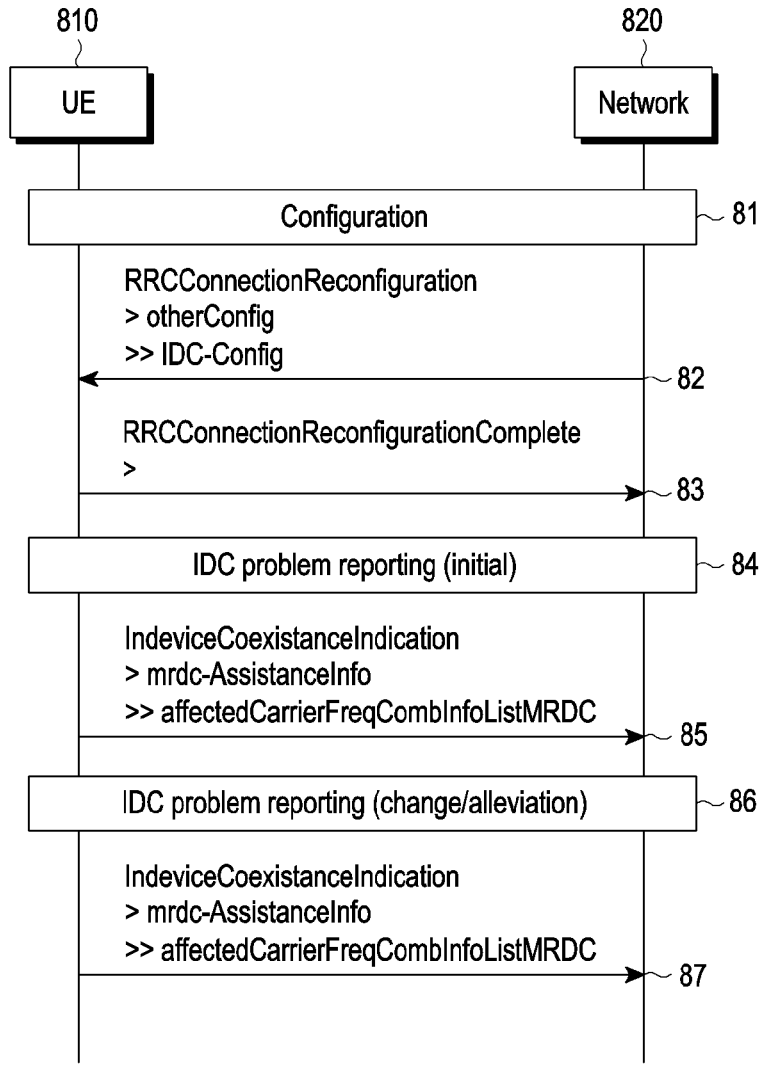
[Fig. 9]
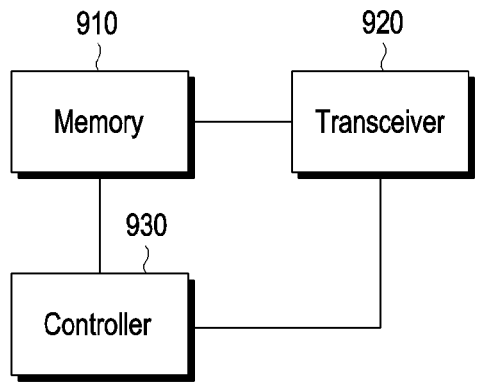

METHOD AND APPARATUS FOR IMPROVEMENTS OF AUTONOMOUS GAPS

CROSS-REFERENCE TO RELATED APPLICATION(S)

This application is a U.S. National Stage application under 35 U.S.C. § 371 of an International application number PCT/KR2020/018586, filed on Dec. 17, 2020, which is based on and claims priority of a United Kingdom patent application number 1918653.5, filed on Dec. 17, 2019, in the United Kingdom Intellectual Property Office, of a United Kingdom patent application number 1918710.3, filed on Dec. 18, 2019, in the United Kingdom Intellectual Property Office, and of a United Kingdom patent application number 2019923.8, filed on Dec. 16, 2020, in the United Kingdom Intellectual Property Office, the disclosure of each of which is incorporated by reference herein in its entirety.

TECHNICAL FIELD

The present invention relates to the use of Autonomous Gaps (AG) for the purpose of, amongst other things, Automatic Neighbour Relation (ANR) in a telecommunication network. The telecommunication network described herein is one of LTE and/or Fifth Generation/NR, although this is not intended to be limiting and other types of network can benefit from embodiments of the invention.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The network typically configures a User Equipment (UE) in connected mode to provide information concerning neighbouring cells e.g. measurement results for the purpose of mobility. The UE typically performs such measurements during idle periods e.g. periods in which UE can employ Discontinuous Reception (DRX) i.e. only monitoring particular time windows during which the network provides scheduling information. In some cases, it is difficult to acquire the requested information during such idle periods e.g. when the UE needs to acquire information periodically broadcast by the concerned neighbour. The UE can alternatively employ so-called Autonomous Gaps, in which case the time interval during which the UE does not receive or transmit any signals in the serving cell may not be limited to an idle period but, for instance, may include time windows in which network may provide scheduling information.

Autonomous gaps may be used when reporting information concerning non-serving cells, in particular when the information to be reported concerns so called System Information (SI) as periodically broadcast by the neighbouring cell. An example of such information concerns the Cell Global Identity (CGI), that the network may use to determine neighbours of the serving cell to which the UE is connected i.e. for ANR purposes. Similarly, the UE may provide such information to assist handover to the concerned neighbouring cell. This is particularly relevant in case there may be confusion about the cell for which the UE provided a measurement report, since the physical cell identity included in such a report may be re-used (this is known in the art as PCI confusion). It is further noted that in case of handover, the provision of such information is rather urgent.

In practice, the network requests the UE to perform a measurement and indicates that the UE is allowed to apply a gap, the size of which is autonomously decided by UE. Upon receiving such a request, the UE may abort communication with all serving cells for a duration below a fixed/specified maximum e.g. 2 s. AG is supported in LTE for the case where the network requires the UE to provide information of a small Closed Subscriber Group (CSG) cell when Handover (HO) to such s cell is imminent (i.e. urgent).

In LTE, the network can indicate that use of an AG is allowed when configuring a measurement of the periodical trigger type and with purpose set to reportCGI. Note further that reportAmount is set to 1 i.e. UE provides a single Measurement Report message (rather than several periodical reports). In LTE, a measurement with purpose reportCGI can include si-RequestFor HO. Furthermore, the network may request the UE to include Multi Frequency Band Indicator (MFBI) information.

In LTE, the information reported by the UE either comprises:

If the cell concerns CSG member cell (inbound mobility to CSG cell): UE only includes info of PLMNs accessible by UE (together with CSG membership flag); or Otherwise: UE includes information of all PLMNs broadcast by network, regardless of whether or not the PLMN is accessible by UE The UE amongst other matters reports CSG ID, TAC, additional PLMN identities, including PLMNs connected to 5GC.

In NR, there are some differences compared to LTE concerning these measurement reporting procedures. As an example, the UE always includes MFBI information i.e. this neither depends on UE capability nor on network configuration. Furthermore, some of the functionality supported in LTE may only be introduced in later versions of NR standards e.g. reporting of information to support mobility to a Closed Subscriber Group (CSG) cell. In terms of reporting, in NR, the UE prepares a report upon acquiring System Information Block (SIB1) or upon determining SIB1 is not broadcast.

DISCLOSURE OF INVENTION

Technical Problem

It is an aim of embodiments of the present invention to utilise such Autonomous Gaps to further improve the operation of the telecommunication network in question. Other problems or issues may also be addressed, whether mentioned herein or not.

According to the present invention there is provided an apparatus and method as set forth in the appended claims. Other features of the invention will be apparent from the dependent claims, and the description which follows.

Solution to Problem

According to a first aspect of the present invention, there is provided a method of a telecommunication network configuring a User Equipment, UE, to report information measured or obtained from a neighbouring cell, whereby the network indicates to the UE whether the UE is allowed to utilise an Autonomous Gap, AG, for its communication with one or more serving cells, while obtaining the information from the neighbouring cell.

In an embodiment, the information reported by the UE relates to system information broadcast by the neighbouring cell.

In an embodiment, the system information, in a case of Automatic Neighbour Relation, ANR, comprises information of PLMNs broadcast by the network regardless of whether or not this PLMN is accessible by the UE or, in a case of enabling handover to a CSG member cell comprises information concerning accessible PLMNs and for each such PLMN information regarding whether the cell provides access for a Closed Subscriber Group (CSG) of which the UE is member.

In an embodiment, if the UE is allowed to utilise an Autonomous Gap, AG, then AG may be configured such that: all of the one or more serving cells are affected; or only the one or more serving cells using shared RF are affected.

In an embodiment, if AG is not configured then the UE uses an idle period to measure or obtain the information from the neighbouring cell.

In an embodiment, the UE is configured for Dual Connectivity, DC.

In an embodiment, the DC is in the form of Multi-RAT DC where the US is configured with a Master Cell Group, MCG, controlled by a Master Node, MN, and a Secondary Cell Group, SCG, controlled by a Secondary Node, SN, and takes the form of one of:
EN-DC, LTE/EUTRA used for MCG cells and NR for SCG cells;
NR DC, NR for MCG and SCG cells; and
NE-DC, NR used for MCG cells and LTE for SCG cells.

In an embodiment, the MN configures AG or either MN or SN configure AG or both MN and SN configure AG.

In an embodiment, either the UE is configured with LTE (EUTRA) PCell while the neighbouring cell concerns an NR cell, or the UE is configured with NR PCell while the neighbouring cell concerns an LTE (EUTRA) or NR cell.

In an embodiment, whichever node configures AG informs the other node if serving cells controlled by the other node are affected.

In an embodiment, the MN ensures Discontinuous Reception, DRX, alignment when configuring the UE to report information measured or obtained from the neighbouring cell:
a) at all times; or
b) only when such alignment is necessary due to the one or more serving cells using shared/common RF components.

In an embodiment, capabilities are provided indicating a need for DRX alignment, such as a single capability cov-
ering support during more than one MRDC case or separate ones for an MRDC case. Similarly, when measuring or obtaining information from the neighbouring cell either introduce single capability for multiple MRDC cases or separate ones for an MRDC case.

According to a second aspect of the present invention, there is provided method of operation of a User Equipment in a telecommunication network comprising the steps of:
the UE reporting its capabilities to the network, including information related to its support for Autonomous Gaps, AG;
the network sending a configuration message to the UE to allow AG;
the UE performing measurements of, or obtaining information from, a neighbouring cell and, while doing so, communication with one or more serving cells is stalled, when using AG; and
the UE reports the measurements or information and resumes communication with the one or more serving cells.

In an embodiment, the UE capabilities comprise one or more of:
information merely indicating that AG is supported;
information indicating multiple capabilities representing multiple scenarios with different affected cells; and
information indicating that performing measurements cannot be achieved without affecting communication with the one or more serving cells.

In an embodiment, a certain capability implicitly indicating use of shared RF components is re-used to indicate that performing measurements cannot be achieved without affecting communication with the one or more serving cells.

According to a third aspect of the present invention, there is provided network node arranged to configure a User Equipment, UE, to report information measured or obtained from a neighbouring cell, whereby the network is arranged to indicate to the UE whether the UE is allowed to utilise an Autonomous Gap, AG, for its communication with one or more serving cells, while obtaining the information from the neighbouring cell.

According to a fourth aspect of the present invention, there is provided UE arranged to:
report its capabilities to a telecommunication network, including information related to its support for Autonomous Gaps, AG;
receive from the network a configuration message allowing AG;
perform measurements of, or obtain information from, a neighbouring cell and, while doing so, to stall communication with one or more serving cells, when using AG; and
report the measurements or information and resume communication with the one or more serving cells.

According to a fifth aspect of the present invention, there is provided a method of a User Equipment, UE, providing UE assistance related to reporting an IDC issue concerning NR frequency bands to a telecommunication network, wherein the UE is configured to report IDC issues concerning one or more portions of the frequency band, wherein one of the following options is used for reporting an IDC issue, depending on the activation status of SCell and/or BandWith Part, BWP:
always report for deactivated items (BW portion, SCell);
never report for deactivated items (BW portion, SCell); and
report for deactivated items, if configured by network.

In an embodiment, the following signal options apply:

| | Network configures portions for which it requests UE to report IDC | Network does not configure portions but requests UE to indicate affected portions |
|---|---|---|
| Configuration | For each portion signal locationAndBandwidth. ARFCN indicates pointA, using following options<br>a) Re-use existing ARFCN i.e. extension concerns list parallel to existing list of frequencies<br>b) For each portion, signal an ARFCN (i.e. do not re-use existing field) | Field in IDC-Config to request UE to provide IDC info per affected portion<br>BTW: ARFCN indicates the band e.g. pointA |
| Reporting | For each affected portion, signal locationAndBandwidth or index as well as IDC info (victim system, direction). Indicate band, using following options:<br>a) Re-use existing ARFCN i.e. extension concerns list parallel to existing list of frequenciess providing the info concerning portions<br>b) For each portion, signal an ARFCN (i.e. do not re-use existing field) | Same as for case network configures portions |

In an embodiment, ARFCN indicates, in configuration and reporting, the following:

When BW portions are not configured in IDC configuration: IDC indicates centre of band; and When BW portions are configured in IDC configuration: IDC indicates pointA or lowest point of portion.

BRIEF DESCRIPTION OF DRAWINGS

For a better understanding of the invention, and to show how embodiments of the same may be carried into effect, reference will now be made, by way of example, to the accompanying diagrammatic drawings in which:

FIG. 1 shows a message exchange associated with an embodiment of the invention;

FIGS. 2a and 2b show message exchanges associated with embodiments of the invention;

FIG. 3 illustrates reporting IDC for a portion of a BW according to an embodiment of the invention;

FIGS. 4, 5, 6 and 7 show signalling details associated with embodiments of the invention;

FIG. 8 shows a message exchange associated with an embodiment of the invention; and FIG. 9 illustrates a block diagram of the UE or the network node associated with an embodiment of the invention.

MODE FOR THE INVENTION

In order to facilitate better understanding of the technical solutions of the embodiments by those skilled in the art, the technical solutions of the embodiments will be described clearly and completely hereinafter in conjunction with the drawings accompanying the embodiments.

Some processes described in the description, claims and the drawings may comprise a plurality of operations that are described in a certain order. However, it should be understood that these operations may be executed in an order rather than the order in which they are described herein or executed in parallel. The reference numbers indicating the operations, such as 101 and 102, are merely used for distinguishing different operations, and the reference numbers themselves do not represent any execution order. In addition, these processes may comprise more or less operations, and these operations may be executed sequentially or in parallel. It is to be noted that the word such as "first" and "second" are used for distinguishing different messages, devices, modules or the like, which neither indicate any sequences nor define different types.

Technical solutions of the embodiments will be explained clearly and completely hereinafter in conjunction with the accompanying drawings. Obviously, the embodiments described herein are only some of rather than all of the embodiments of the present disclosure. Any other embodiments obtained by those skilled in the art based on the embodiments without any creative work will fall into the protection scope of the present disclosure.

Each block of the flowchart illustrations, and combinations of blocks in the flowchart illustrations, can be implemented by computer program instructions. The computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur in a different order. For example, two blocks illustrated in succession may in fact be executed substantially concurrently or the blocks may sometimes be executed in the reverse order, depending upon the functionality involved.

Herein, the term "unit" may indicate a software or hardware component, such as a field-programmable gate array (FPGA) or an application specific integrated circuit (ASIC), and a "unit" performs any function. However, a "unit" or "module" is not limited to software or hardware. A "unit" or "module" may be constructed either to be stored in an addressable storage medium or to execute one or more processors. Therefore, a "unit" or "module" may include, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" or "module" may be either combined into a smaller number of elements, "units", or "modules" or divided into a larger number of elements, "units", or "modules". The elements, "units" and/or "modules" may be implemented to reproduce one or more central processing units (CPUs) within a device or a security multimedia card.

Although embodiments of the present disclosure are described below with reference to an 3GPP-based radio communication system, the present disclosure is also applicable to other communication systems and services having similar technical backgrounds.

In the prior art LTE system, use is made of reportCGI, which is a message whereby information is provided, by the UE to the network, of Cell Global Identity (CGI). CGI is a globally unique identifier for a cell in a mobile telecommunication network.

In LTE, there are two reportCGI use cases:
1) reportCGI without si-RequestForHO, used for the purpose of ANR; and
2) reportCGI without si-RequestForHO, used to enable HO to CSG member cell by also providing information regarding whether the cell provides access for a Closed Subscriber Group (CSG) of which the UE is member In the foregoing, si-RequestForHO is a field that applies to the reportCGI functionality, and when the field is included, the UE is allowed to use autonomous gaps, AG, in acquiring system information from a neighbouring cell. In such case, the UE applies a different value for the T321 timer, and includes different fields in the measurement report.

If autonomous gaps are used to perform measurements, the UE is allowed to temporarily abort communication with all serving cell(s), i.e. to create autonomous gaps to perform the corresponding measurements within the limits specified in TS 36.133. Otherwise, the UE only performs the measurements with the purpose set to reportCGI only during idle periods and may succeed only if E-UTRAN provide sufficient idle periods.

In LTE, there is no separate configuration parameter by which the network indicates whether the UE is allowed to use Autonomous Gap (AG) or not. The UE is allowed to use AG only for case 2) above and in such case, the use of AG is always allowed.

In LTE, the information reported by the UE differs for the two cases. In case 1), ANR: this includes information of PLMNs broadcast by the network regardless of whether or not this PLMN is accessible by the UE in question. In case 2), CSG member: If the cell concerns a CSG member, the UE only includes info of PLMNs accessible by the UE (with CSG membership status (yes/no)).

In LTE, there is a separate network configuration parameter as well as a separate UE capability for providing Multi Frequency Band Indicator (MFBI) information. By contrast, MFBI information is always included in NR.

In the present state of specification in NR, it is assumed that AG is to be supported for reporting CGI cases as follows:
When reporting information concerning NR cell, while served by LTE or NR PCell
When reporting information concerning LTE cell, when served by NR Pcell Further, it is assumed that use of AG is agreed for reportCGI for ANR purposes, since inbound mobility to CSG cell has not been agreed for NR, neither for mobility within NR nor from LTE to NR. Hence in the following, ANR typically refers to the case the UE is requested to measure and report the CGI of the concerned cell for ANR purposes.

The following concerns AG for ANR where the UE is in communication with an LTE PCell.

It is preferred not to re-use existing configuration/capability known from the prior art.

It is preferable to have an indication separate from si-RequestForHO, as information reported with si-RequestForHO is somewhat different (reduced) and concerns a different/separate UE capability.

The need for AG depends on the use of shared RF i.e. depending on whether RF components are shared between Frequency Range 1 (FR1) and Frequency Range 2 (FR2). It is commonly assumed that FR2 is supported by a dedicated RF transceiver and hence that measurement on FR2 frequencies should not affect serving cells using E-UTRA or NR FR1.

If the UE shares RF for LTE and NR FR1 i.e. uses a single/common RF component, an ANR measurement for an NR FR1 cell always requires an AG.

If the UE uses separate RF for NR, but shared for FR1 and FR2, an ANR measurement for an NR cell requires an AG if UE is configured with an NR serving cell.

If the UE uses separate RF for NR, and separate RF for FR1 and FR2, ANR of NR FRx cell requires AG if UE is configured with NR FRx serving cell.

The existing LTE UE capability parameter eutra-CGI-Reporting-ENDC is assumed to indicate that RF for LTE and NR FR1 is separate (i.e. not shared).

In an embodiment, in LTE, a field is introduced by which the network can indicate that the UE is allowed to employ an AG for an ANR measurement In an embodiment, options are provided for use of AG configuration and the serving cells affected:
1) All serving cells are considered to be affected;
2) Only serving cells using shared RF are considered to be affected:
ANR for NR cell in FR1: affected are E-UTRA serving cells and NR serving cells in FR1
ANR for NR cell in FR2: affected are NR serving cells in FR2

In an embodiment, if AG is not configured while the UE shares RF, then the UE performs the ANR measurement in idle period(s) i.e. outside MCG on-duration and SCG on-duration In an embodiment, the network may use LTE UE capability concerning RF sharing/need for Discontinuous Reception (DRX) alignment to determine the need for AG. This requires a clarification of existing LTE capability eutra-CGI-Reporting-ENDC to indicate that RF for LTE and NR FR1 is separate (i.e. not shared). Additional LTE capabilities are introduced to indicate RF sharing for other cases, in particular to indicate whether for FR1 and FR2 the UE employs a common or separate RF components.

In an embodiment, LTE capability is introduced by which the UE can indicate its support for AG. This can take the form of a single capability covering support of AG mechanism or multiple capabilities (i.e. for different scenarios with different affected cells).

In an embodiment, for si-RequestForHO the same principles can be used i.e. same principles regarding which serving cells are affected when AG is used. Also, for this case, the use of AG can be made configurable i.e. it is up to network configuration and depending on UE capabilities. Furthermore, the signalling that will be introduced for ANR can be re-used for si-RequestForHO.

The following concerns AG for ANR where the UE is in communication with an NR PCell.

Many of the considerations regarding RF sharing when configured with LTE Pcell apply equally here. Use of AG applies for NR and EUTRA target cells.

In an embodiment, the same principles are adopted as when configured with LTE PCell. A field is introduced by which the network can indicate that UE is allowed to employ AG for ANR. If AG is configured, serving cells considered to be affected can either be:

a) all; or
b) only serving cells using shared RF are considered to be affected.

ANR for NR cell in FR1: affected are E-UTRA serving cells and NR serving cells in FR1

ANR for NR cell in FR2: affected are NR serving cells in FR2

ANR for LTE cell: affected are E-UTRA serving cells and NR serving cells in FR1

If AG is not configured while the UE shares RF, then the UE performs ANR in idle periods i.e. outside MCG on-duration and SCG on-duration.

The network may use NR UE capabilities regarding RF sharing/DRX alignment to determine the need for AG. NR capabilities are introduced indicating RF sharing for other cases, in particular a parameter to indicate whether for LTE and FR1 the UE employs a common or separate RF components, a parameter to indicate whether for FR1 and FR2 the UE employs a common or separate RF components.

An NR capability is introduced by which the UE can indicate support for AG i.e. a single capability covering support of AG mechanism or multiple capabilities (i.e. separate capabilities for different scenarios with different affected cells).

The same principles can be used for si-RequestForHO/SI reporting to support inbound mobility to CSG alike cell i.e. using the same principles (e.g. serving cells affected when using AG) and signalling as for ANR (same configuration and UE capability fields).

The following concerns inter-node aspects related to AG for ANR as used in case the UE is configured with Multi RAT Dual connectivity i.e. UE is configured with a Master Cell Group (MCG) controlled by a Master Node (MN) and a Secondary Cell Group (SCG) controlled by a Secondary Node (SN). Examples of multi-radio dual connectivity, MRDC, concern EN-DC (LTE/EUTRA used for MCG cells and NR for SCG cells), NR-DC (NR for MCG and SCG cells) and NE-DC (NR used for MCG cells and LTE for SCG cells).

In case of MRDC, both Master Node (MN) and Secondary Node (SN) may need to take AG into account when scheduling the UE, depending on the affected serving cells.

It is currently unclear whether the MN or SN may configure AG. The MN is aware of both MN and SN initiated ANR requests. The MN has the information required to decide e.g. UE capabilities regarding RF sharing, FR of each SCG serving cells.

For SN initiated ANR, SN generates the measConfig for ANR (i.e. reportCGI). This is transferred via SRB1, and transferred to the UE embedded in an MN generated message.

The AG field could still be included within the MN generated measConfig, which is acceptable if MCG serving cells are affected, but may not be appropriate if no MCG cells are affected.

An issue to consider is whether it is appropriate for MN to set if this is SN initiated and MCG cells are not affected and whether for SN initiated case also affecting MCG cells, SN should set/generate the field.

In an embodiment, the node configuring the AG should inform the other node about AG. The node configuring AG may only inform the other node if that other node controls serving cells that are affected.

In an embodiment, there are several options regarding which node configures AG:

a) MN always configures AG
In some cases only SCG cells are affected
b) Either MN or SN configures AG
b.1) Initiating node sets AG
b.2) Initiating nodes sets AG, but if SN initiates SN sets AG unless MCG cells are also affected
c) Both nodes may configure AG Initiating node sets AG. In case SN initiates, MN may also set AG if MCG cells are affected also.

Examples of the use of the above options is shown for EN-DC (EUTRA-NR Dual Connectivity), in Table a below. The most straightforward approach is that the Initiating node sets AG.

TABLE 1

| Case | Initiator | Target | RF sharing | MCG affected | SCG affected | Opt a) | Opt b) | Opt c) |
|------|-----------|--------|------------|--------------|--------------|--------|--------|--------|
| EN-DC | MN | LTE | LTE-FR1 | Yes | FR1 | MN | MN | MN |
| EN-DC | MN | LTE | FR1-FR2 | Yes | None | MN | MN | MN |
| EN-DC | MN | NR FR1 | LTE-FR1 | Yes | FR1 | MN | MN | MN |
| EN-DC | MN | NR FR2 | LTE-FR1 | No | FR2 | MN | MN | MN |
| EN-DC | MN | NR FRx | FR1-FR2 | No | All | MN | MN | MN |
| EN-DC | SN | NR FR1 | LTE-FR1 | Yes | FR1 | MN | MN or SN | Both |
| EN-DC | SN | NR FR2 | LTE-FR1 | No | FR2 | MN | SN | Both |
| EN-DC | SN | NR FRx | FR1-FR2 | No | All | MN | SN | SN |

FIG. 1 illustrates the signalling between UE 10 and MN 20.

At step 1, the UE 10 reports its UE capabilities to the MN 20, including whether it supports AG by using a UECapabilityInformation message comprising a parameter anr-AG-Support.

At step 2, the Network 20 configures ANR measurement with AG by using a RRCReconfiguration message comprising measConfig. The measConfig comprises a parameter reportConfig (useAG) in measIdToAddMod (reportCGI).

At step 3, the UE 10 confirms and performs ANR related measurement by using RRCReconfigurationComplete message. The UE determines affected serving cells and, while performing ANR with AG, it temporarily stalls communications with these cells.

At step 4, the UE reports the ANR measurement result by using a MeasurementReport message. Upon reporting, the UE resumes communication with all serving cells.

FIG. 2a illustrates inter-node interaction in the case MN initiates the ANR measurement. In this case, signalling between 3 entities is shown: UE 110, MN 120, SN 130.

Here, the MN 120 determines if SCG serving cells are affected by AG and if so, it informs SN 130 at step 11, Initial configuration and at step 16, upon receiving ANR related measurement report (SCG serving cells no longer affected).

The SN 130 stops scheduling the UE via affected cells i.e. in the time between steps 11 to 16.

FIG. 2b illustrates inter-node interaction in the case SN initiates the ANR measurement. In this case, signalling between 3 entities is shown: UE 210, MN 220, T-SN 230.

In this case, the procedure is similar to that set out in relation to FIG. 2a, but the SN 230 now determines whether the MCG serving cells are affected and, if so, it informs the MN 220, also, when ANR measurement is finished i.e. following receipt of MR message at step 25.

In this case, the MN 220 now stops scheduling the UE 210 via affected cells, when applicable i.e. between steps 21 to 26.

The following table, TABLE 2, provides an overview of ANR measurements as can be used in different cases, covering cases with MRDC (EN-DC, NR-DC and NE-DC) as well as cases without (LTE SA and NR SA)

TABLE 2

| Case | Target | MN ini | SN ini |
|---|---|---|---|
| LTE-SA | LTE | y | NA |
| LTE-DC | LTE | y | n |
| EN-DC | LTE | y | n |
|  | NR | y | y |
| NR-SA | NR | y | NA |
| NR-DC | NR | y | y |
|  | LTE | y | n |
| NE-DC | NR | y | n |
|  | LTE | y | y |

The UE typically performs ANR during idle periods i.e. outside DRX on-duration. ANR based on UE autonomous gap is also supported, as described above.

In case of DC, the separate DRX can be configured for MCG and SCG. However, the nodes exchange the DRX configuration so the nodes can align the periods during which the UE needs to be active and when it can be idle, thereby increasing opportunities for performing ANR.

The UE requires certain capabilities for EN-DC. Including separate capabilities for support of ANR during EN-DC, with additional capability for each case i.e. ANR for LTE, UMTS/GERAN, NR. It also requires separate capabilities for support of ANR with or without SCG on-duration contained in MCG on-duration.

With regard to ANR in Multi-RAT Dual Connectivity (MR-DC), the network configures the UE with, at most, one ANR measurement. The SN may initiate ANR, but involves the MN, that forwards the SN generated measConfig embedded within an MN generated message, via Signalling Radio Bearer 1 (SRB1) to the UE. In the ANR request, the SN may include PCI of the target cell and the MN may reply without actually involving the UE i.e. in case MN has the concerned ANR information, it can respond to the request from SN by itself.

Certain general MRDC aspects are relevant for ANR. One such aspect is that the MN and the SN share their DRX configurations to facilitate alignment. This is beneficial in general, but also for ANR. Another such aspect is that the MN does not provide a capability container for MCG RAT to the SN. This affects in which container to signal the ANR capabilities (e.g. in LTE, NR and/or MRDC container), which also relates to the role of the MN and the SN regarding setting and signalling the configuration regarding AG.

The following relates to ANR with MRDC, with a focus on DRX alignment.

The need for DRX alignment in MRDC depends on whether RF components are shared for cells in MCG and SCG. For EN-DC/NE-DC, DRX alignment is needed if the UE shares RF for some LTE and NR FR1 frequencies. I.e. the existing UE capability indicating that alignment of MCG and SCG DRX is not required for performing ANR of LTE cell while in EN-DC actually indicates that separate RF circuitry is used for LTE and NR. It is further noted that FR2 is always supported by RF circuitry which is separate from that which is used for LTE.

The previous observation implies that the existing capability indicating that alignment of MCG and SCG DRX is not required for ANR of LTE cell in EN-DC equally indicates that such DRX alignment is not required for the following cases:

a) ANR of NR cell in EN-DC as well as for
b) ANR of LTE cell in NE-DC

It is further noted that for a UE sharing RF components, alignment of MCG and SCG DRX is sufficient. In other words, there is no need for SCG on-duration to be fully contained within MCG DRX on-duration.

In terms of node responsibility/interaction, in an embodiment, the MN ensures DRX alignment using one of the following options:

1) When the UE performs ANR, the MN ensures MCG DRX is always set to be aligned with SCG DRX. The MN may reconfigure MCG DRX when transferring ANR request to UE.
2) When the UE performs ANR, the MN ensures such DRX alignment when the UE performs ANR, only if the UE requires this according to the UE capabilities. This is based on either:
   a UE capability is introduced for each individual case e.g. separate ones for EN-DC and NE-DC; or
   a UE capability is introduced for each RF sharing case: LTE and NR FR1 (as per existing LTE capability, relevant for EN-DC and NE-DC); and NR FR1 and NR FR2 (relevant for NR-SA and NR-DC).

Option 2) above is an enhancement of option 1) above.

The MN can ensure required DRX alignment because the MN is aware of any ANR i.e. also of any SN initiated case. For EN-DC, the LTE capabilities (that only the MN is aware of), provide sufficient information, as set out above.

A further aspect concerns the UE capabilities for ANR. As a starting point, Table 3 provides an overview of the Feature Group Indicators (FGI) and UE capabilities introduced in LTE while Table 4 provides an overview of the UE capabilities introduced in NR.

TABLE 3

| Name | Case | Target | DRX alignment |
|---|---|---|---|
| FGI17/18 | EN-DC | LTE | MCG contains |
| eutra-CGI-Reporting-ENDC | EN-DC | LTE | None |
| utra-GERAN-CGI-Reporting-ENDC | EN-DC | UTRA/GERAN | None |
| reportCGI-NR-NoEN-DC | EN-DC | NR | — |
| reportCGI-NR-EN-DC | EN-DC | NR | — |

TABLE 4

| Name | Case | Target | DRX alignment |
|---|---|---|---|
| nr-CGI-Reporting | SA | NR | NA |
| nr-CGI-Reporting-ENDC | EN-DC | NR | — |
| eutra-CGI-Reporting | SA | LTE | NA |

To some extent, the EN-DC framework has been adopted for MRDC i.e. for ANR/CGI reading, there is a separate capability for the case that the UE is in EN-DC. However, it is possible to somewhat reduce the number of UE capabilities. In an embodiment, a separate capability is introduced to indicate ANR support during MRDC. Furthermore, such (single) capability covers support during more than one MRDC case e.g. a field "eutra-CGI-Reporting-MRDC" is used for support while in NR-DC and while in NR-DC (instead of separate eutra-CGI-Reporting-NRDC & eutra-CGI-Reporting-NEDC capabilities). This is to reduce the number of UE capabilities.

Corresponding UE capability changes are required. These include:
  LTE capability eutra-CGI-Reporting-ENDC field also indicates support of ANR for NR cell in EN-DC without any DRX alignment
  LTE capability eutra-CGI-Reporting-ENDC indicates that RF for LTE and NR FR1 is separate (i.e. not shared)
  Within NR capabilities, introduce parameter indicating that the UE supports ANR without DRX alignment
  For the parameter within NR capabilities indicating ANR support without DRX, introduce separate fields for:
  NE-DC (indicating that the UE employs separate RF for LTE and NR FR1)
  NR-SA & NR-DC (indicating that the UE employs separate RF for NR FR1 and NR FR2)
  Within NR capabilities, indicating ANR support in MRDC as follows:
  Clarify that nr-CGI-Reporting-ENDC also covers support for other MRDC cases (i.e. NE-DC and NR-DC), or add separate capabilities for these MR-DC cases
  Introduce eutra-CGI-Reporting-MRDC to cover support in NE-DC and NR-DC, or create separate capabilities for these MR-DC cases An embodiment of the present invention relates to the reporting of In Device Coexistence (IDC) in a UE. In particular, it relates to the reporting of IDC in LTE, pertaining to NR frequencies.

The network can request the UE to perform IDC reporting for NR frequency bands by indicating an Absolute Radio Frequency Channel Number (ARFCN), which may concern the centre frequency of a particular UE channel bandwidth (BW). The UE, when asked to report in this way, is not aware whether the network is just planning to use a subset of the channel BW, as opposed to the entire BW. In other words, the UE can only provide a worst-case indication. It should further be noted that reporting covers both currently serving and candidate cells i.e. neighbouring frequencies on which network considers configuring a serving cell.

In the prior art, it is unclear whether IDC reporting by the UE should take into account whether (NR) Secondary Cell (SCell) and/or BandWidth Part (BWP) is activated or deactivated.

According to an embodiment, further different options for reporting IDC problems are presented, depending on activation status of SCell and/or BW portion:
  1) Always report for deactivated items (BWP, SCell)
  2) Never report for deactivated items (BWP, S Cell)
  3) Report for deactivated items, if configured by network (i.e. introduce a field by which network can control this)

An advantage of option 1) above, is that the network will be aware of IDC issues before activating an SCelll or BWP. Furthermore, this option avoids the UE triggering an IDC report upon every change in activation state.

In regard to option 3) above, the network might employ deactivation to combat IDC. In such case, an option in which the UE does not report IDC for deactivated items would enable network to determine whether deactivation solved the IDC problem.

According to a co-pending application, commonly assigned, two options are presented:
  a) the network will signal one or more candidate BW portions for which UE should provide IDC reports; or
  b) the UE signals for which portion of the band it experienced IDC (i.e. the UE performs monitoring for entire UE channel BW)

According to an embodiment, signalling is provided for reporting IDC for a portion of a BW. This is illustrated in FIG. 3, which shows options a) and b) referred to above.

In case of option a), the configuration provided by the network includes a locationAndBandwidth for each BW portion. Such locationAndBandwidth can define, in the frequency domain, an offset and a width of the BW portion as reflected by RBstart and LRB in FIG. 3 respectively. It is noted that RBstart can be defined as an offset compared to pointA, which can be a reference point common for all BW portions in the frequency band.

According to an embodiment, the IDC configuration as signalled by the network to the UE can be done in two ways:
  Signal for each frequency band the associated BW portions i.e. signal an ARFCN (one per band) and for each BW portion within this band a separate locationAndBandwith.
  Signal for each BW portion both an ARFCN as well as a locationAndBandwith. I.e. in this option, the ARFCN is signalled multiple times when there are multiple BW portions per frequency band.

For option 1, the signalling details are illustrated by FIG. 4 that shows the corresponding changes to the ASN.1. In this option 1, the ARFCN as present in the legacy standards can be re-used. i.e. all frequency bands are listed in the legacy field candidateServingFreqListNR within idc-Indication-MRDC. The extension in candidateServingFreqListNR-v16xy concerns a parallel list, with the same number of entries and in same frequency band order, defining for each band the associated BW portions, if applicable. i.e. it is possible to not signal BW portions for one or more frequency bands, in which case the UE does not provide IDC reports for a specific BW portion.

FIG. 4 shows the configuration 0 . . . 4 BW portions per NR frequency band. Within IDC-Config, as shown, the network can provide for NR frequencies a list of BW portion (0 . . . 4). ASN.1 variants achieving the same or similar also apply.

For option 2, the signalling details are illustrated by FIG. 5 that shows the corresponding changes to the ASN.1. In this option 2, each frequency band for which network configures IDC reporting per BW portion is configured by a separate frequency list i.e. by the extension in candidateServing-FreqListExtNR. The original field can still be used for frequency bands for which IDC reporting is not configured per BW portion, in which case the UE does not provide IDC reports for a specific BW portion. The signalling details are illustrated by FIG. 4, that shows the corresponding changes to the ASN.1.

In contrast to FIG. 4, here separate NR frequency entries are configured for each BW portion. To facilitate this, the list of NR frequencies is extended:
  a) ARFCN indicating to pointA+locationAndBandwith (shown in FIG. 5)

b) ARFCN indicating BW portion and Bandwith (not shown)

ASN.1 variants achieving the same or similar also apply.

According to an embodiment, the IDC report as signalled by UE to the network not only comprises an indication of the affected BW portions, but also for each affected BW portion the further IDC assistance information such as the victim system type and the direction of the IDC.

The indication of the affected BW portions can again be done in two ways:

Signal for each frequency band affected by IDC the associated BW portions i.e. signal an ARFCN (one per frequency band) and then provide the list of affected BW portion associated with this band.

Signal for each affected BW portion both an ARFCN as well as an indication of the affected BW portion. I.e. in this option, the ARFCN is signalled multiple times when there are multiple affected BW portions per frequency band.

In case the network does not configure the BW portions for which it would like to receive IDC reports, the IDC report from the UE needs to explicitly indicate the actual details of BW portions. This can be slightly different ways:

ARFCN indicates pointA, with each affected BW portion being indicated by a locationAndBandwidth ARFCN indicates the start of centre of the affected BW portion, in which case only BW needs to be indicated (i.e. no need for offset as in locationAndBandwidth)

For option 1, the signalling details are illustrated by FIG. 6, which shows the corresponding changes to the ASN.1. In this option 1, the ARFCN as present in the legacy standards can be re-used. i.e. all frequency bands are listed in the legacy field affectedCarrierFreqCombInfoListMRDC within mrdc-AssistanceInfo. The extension in affectedCarrierFreqCombInfoListMRDC-v16xy concerns a parallel list, with same number of entries and in same frequency band order, defining for each band the associated affected BW portions.

The report for 0 . . . 4 BW portions per NR freq band is shown, where existing ARFCN indicates the band e.g. pointA. For each affected BW portion, the UE provides IDC info (victim, direction). The affected BW portion can be identified/indicated by locationAndBandwith, ARFCN or index (only 1st option shown here).

ASN.1 variants achieving the same or similar also apply.

For option 2, the signalling details are illustrated by FIG. 7, which shows the corresponding changes to the ASN.1. In this option 2, each frequency band for which the UE reports IDC per BW portion is signalled by a separate and self-contained list i.e. by the extension in affectedCarrierFreqCombInfoListExtMRDC. The original field can still be used for frequency bands for which IDC reporting is not configured per BW portion, for which case the UE does not provide IDC reports for a specific BW portion. The signalling details are illustrated by FIG. 7, that shows the corresponding changes to the ASN.1.

ASN.1 variants achieving the same or similar also apply.

According to an embodiment, the frequency/ARFCN may be signalled without and with signalling a BW portion. What the frequency/ARFCN represents can be different in these two cases, i.e. as follows:

IDC configuration/reporting without signalling BW portion: frequency is indicated by ARFCN indicating centre of frequency band or channel bandwidth.

IDC configuration/reporting with signalling BW portion: frequency is indicated by ARFCN indicating a) point A (lowest point of band) or b) lowest point of BW portion FIG. 8 shows the message exchanges associated with configuration, IDC problem reporting (initial) and IDC problem reporting (change/alleviation).

At step 81, the configuration is established between the UE 810 and the network node 820. At step 82, the network node 820 transmits, to the UE 810, a RRCConnectionReconfiguration message comprising the IDC-Config in otherConfig, and, at step 83, the network node receives, from the UE, a RRCConnectionReconfigurationComplete message. At steps 84 and 85, the UE can perform IDC problem reporting (initial) with the network node, and can transmit InDeviceCoexIndication comprising mrdc-Assistanceinfo and affectedCarrierFreqCombInfoListMRDC. Also, at steps 86 and 87, the UE can perform IDC problem reporting (change/alleviation), and can transmit InDeviceCoexIndication comprising mrdc-Assistanceinfo and affectedCarrierFreqCombInfoListMRDC.

FIG. 9 illustrates a block diagram of the UE or the network node associated with an embodiment of the invention.

As shown in FIG. 9, the UE or the network node comprises a transceiver 920, a controller (that is at least one processor) 930, and a memory 910. The controller 930 can be configured to control the transceiver 920 and the memory 910 according to at least one of the embodiments described in this present disclosure.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which:

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a communication network system, the method comprising:
reporting, to a network node, UE capability information including first information related to support for autonomous gaps (AG);
receiving, from the network node, a configuration message to allow the AG;
performing measurement of a neighboring cell or obtaining second information from the neighboring cell, and pausing communication with at least one serving cell while the AG is used; and
reporting a result of the measurement or the second information, and resuming the communication with the at least one serving cell.

2. The method of claim 1, wherein the UE capability information includes at least one of:
information indicating that the AG is supported;
information indicating multiple capabilities representing multiple scenarios with different affected cells; and
information indicating that the measurement is not performed without affecting the communication with the at least one serving cell.

3. The method of claim 1, further comprising:
re-using a certain capability indicating use of shared radio frequency (RF) components to indicate that the measurement is not performed without affecting the communication with the at least one serving cell.

4. The method of claim 1, wherein the second information is related to system information broadcast by the neighboring cell.

5. The method of claim 4, wherein the system information includes:
in a case of automatic neighbor relation (ANR), information on public land mobile networks (PLMNs) broadcast by the network node, regardless of whether the PLMNs are accessible by the UE, or
in a case of enabling handover to a closed subscriber group (CSG) member cell, information concerning accessible PLMNs and information for each PLMN regarding whether a cell provides access for a CSG of which the UE is a member.

6. The method of claim 1, wherein the at least one serving cell is affected based on the AG, in response to the configuration message.

7. The method of claim 1,
wherein the UE is configured for multi radio access technology (multi-RAT) dual connectivity (DC), and
wherein the UE is configured with a master cell group (MCG) controlled by a master node (MN) and a secondary cell group (SCG) controlled by a secondary node (SN) based on the multi-RAT DC.

8. The method of claim 7, wherein the AG is configured by one of:
the MN,
either the MN or the SN, or
both the MN and the SN.

9. The method of claim 8, wherein a second node is informed by the network node configuring the AG in case that at least one serving cell controlled by the second node is affected.

10. A user equipment (UE) in a communication network system comprising:
a transceiver; and
a controller
configured to:
report to a network node, UE capability information including first information related to support for autonomous gaps (AG),
receive, from the network node, a configuration message to allow the AG,
perform measurement of a neighboring cell or obtain second information from the neighboring cell and pause communication with at least one serving cell while the AG is used, and
report a result of the measurement or the second information, and resume the communication with at least one serving cell.

11. The UE of claim 10, wherein the UE capability information includes at least one of:
information indicating that the AG is supported;
information indicating multiple capabilities representing multiple scenarios with different affected cells; and
information indicating that the measurement is not performed without affecting the communication with the at least one serving cell.

12. The UE of claim 10, the controller further configured to:
re-use a certain capability indicating use of shared radio frequency (RF) components to indicate that the measurement is not performed without affecting the communication with the at least one serving cell.

13. The UE of claim 10, wherein the second information is related to system information broadcast by the neighboring cell.

14. The UE of claim 13, wherein the system information includes:
in a case of automatic neighbor relation (ANR), information on public land mobile networks (PLMNs) broadcast by the network node, regardless of whether the PLMNs are accessible by the UE, or
in a case of enabling handover to a closed subscriber group (CSG) member cell, information concerning accessible PLMNs and information for each PLMN regarding whether a cell provides access for a CSG of which the UE is a member.

15. The UE of claim 10, wherein the at least one serving cell is affected based on the AG, in response to the configuration message.

16. The UE of claim 10,
wherein the UE is configured for multi radio access technology (multi-RAT) dual connectivity (DC), and
wherein the UE is configured with a master cell group (MCG) controlled by a master node (MN) and a secondary cell group (SCG) controlled by a secondary node (SN) based on the multi-RAT DC.

17. The UE of claim 16, wherein the AG is configured by one of:
the MN,
either the MN or the SN, or
both the MN and the SN.

18. The UE of claim 17, wherein the second node is informed by the network node configuring the AG in case that at least one serving cell controlled by the second node is affected.

19. A method performed by a network node in a communication network system, the method comprising:
receiving, from a user equipment (UE), UE capability information including first information related to support for autonomous gaps (AG);
transmitting, to the UE, a configuration message to allow the AG;
receiving, from the UE, a result of measurement of a neighboring cell or second information,
wherein communication with the UE is paused while the measurement of the neighboring cell is performed or the second information is obtained, and the AG is used.

20. A network node in a communication network system comprising:
a transceiver; and
a controller configured to:
receive from a user equipment (UE), UE capability information including first information related to support for autonomous gaps (AG),
transmit to the UE, a configuration message to allow the AG,
receive from the UE, a result of measurement of a neighboring cell or a second information,
wherein communication with the UE is paused while the measurement of the neighboring cell is performed or the second information is obtained, and the AG is used.

* * * * *